US009497316B2

(12) United States Patent
Croot et al.

(10) Patent No.: US 9,497,316 B2
(45) Date of Patent: Nov. 15, 2016

(54) DATA COMMUNICATION

(71) Applicant: BRITISH TELECOMMUNICATIONS PLC, London (GB)

(72) Inventors: Christopher Marcus Croot, London (GB); Ashley Pickering, London (GB); Philipp Anthony Everett, London (GB); Alan Edson Cooper, London (GB); Ian Edwin Horsley, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 40 days.

(21) Appl. No.: 14/381,054

(22) PCT Filed: Feb. 15, 2013

(86) PCT No.: PCT/GB2013/000064
§ 371 (c)(1),
(2) Date: Aug. 26, 2014

(87) PCT Pub. No.: WO2013/128150
PCT Pub. Date: Sep. 6, 2013

(65) Prior Publication Data
US 2015/0003596 A1 Jan. 1, 2015

(30) Foreign Application Priority Data

Feb. 29, 2012 (EP) .................................. 12250045

(51) Int. Cl.
*H04M 1/24* (2006.01)
*H04M 3/08* (2006.01)
*H04M 3/22* (2006.01)
*H04M 3/36* (2006.01)
(Continued)

(52) U.S. Cl.
CPC .......... *H04M 3/367* (2013.01); *H04L 12/2869* (2013.01); *H04L 12/2878* (2013.01);
(Continued)

(58) Field of Classification Search
CPC .. H04M 3/2209; H04M 3/306; H04M 3/305; H04M 1/24; H04M 3/304; H04M 3/308; H04M 3/08; H04M 3/323
USPC ................................ 379/1.01, 1.03, 1.04, 28
See application file for complete search history.

(56) References Cited

U.S. PATENT DOCUMENTS 7,272,209 B2 * 9/2007 Jiang ..................... H04M 3/305
379/1.03
7,830,955 B2 * 11/2010 Cioffi .................... H04L 5/1438
375/222

(Continued)

FOREIGN PATENT DOCUMENTS

WO  WO 2007/012867   2/2007
WO  WO 2007/012869   2/2007

(Continued)

OTHER PUBLICATIONS

International Search Report for PCT/GB2013/000064 mailed Mar. 21, 2013.

(Continued)

Primary Examiner — Quoc D Tran
(74) Attorney, Agent, or Firm — Nixon & Vanderhye P.C.

(57) ABSTRACT

A method and corresponding device for determining a data connection profile for a data connection (15) between one of a plurality of end-user devices (14, 16, 18) and an aggregation transceiver device (24, 34), the data connection belonging to one of a plurality of predetermined categories, each category being associated with one of a plurality of service providing entities (62, 64, 66), the method comprising receiving performance data indicative of the performance of a data connection; receiving an entity identifier indicative of one of said plurality of service providing entities, and determining in dependence thereon the category to which the data connection belongs; and determining a data connection profile for the data connection in dependence on the performance data and on the category so-determined, the data connection profile specifying a set of values for one or more parameters associated with the data connection.

24 Claims, 7 Drawing Sheets

(51) Int. Cl.
   *H04L 12/28* (2006.01)
   *H04L 12/26* (2006.01)
   *H04L 12/24* (2006.01)
   *H04M 3/30* (2006.01)
   *H04M 11/06* (2006.01)
   *H04M 3/00* (2006.01)
   *H04L 12/851* (2013.01)

(52) U.S. Cl.
   CPC ....... *H04L41/0896* (2013.01); *H04L 43/0829* (2013.01); *H04M 3/007* (2013.01); *H04M 3/2227* (2013.01); *H04M 3/304* (2013.01); *H04M 3/365* (2013.01); *H04M 11/062* (2013.01); *H04L 47/24* (2013.01); *H04M 2201/12* (2013.01)

(56) References Cited

U.S. PATENT DOCUMENTS

2008/0049628 A1* 2/2008 Bugenhagen ......... H04W 24/02
                                                   370/244
2009/0207985 A1   8/2009 Cioffi et al.
2010/0034216 A1*  2/2010 Pickering ............ H04L 41/0816
                                                   370/464
2010/0183062 A1   7/2010 Everett et al.

FOREIGN PATENT DOCUMENTS

WO   WO 2008/093045    8/2008
WO   WO 2009/081129    7/2009
WO   WO 2009/081131    7/2009
WO   WO 2012/042231    4/2012

OTHER PUBLICATIONS

Written Opinion of the International Searching Authority for PCT/GB2013/000064 mailed Mar. 21, 2013.
"Dynamic Line Management for Digital Subscriber Lines", Internet Citation, Apr. 8, 2005, XP-002442256, 10 pages.

* cited by examiner

Table 1(a)

Table 1(c)

Table 1(b)

| Stability | Metric | Very Poor | Poor | OK | Good |
|---|---|---|---|---|---|
| Aggressive | Re-Trains | >10 per hour | mtb<3600 | mtb<8640 | mtb≥8640 |
| Aggressive | Errors | | mtb<10 | mtb<8640 | mtb≥8640 |
| Normal | Re-Trains | >10 per hour | mtb<7200 | mtb<8640 | mtb≥8640 |
| Normal | Errors | | mtb<300 | mtb<8640 | mtb≥8640 |
| Stable | Re-Trains | > 10 per hour | mtb<28800 | mtb<86400 | mtb≥86400 |
| Stable | Errors | | mtb<1000 | mtb<28800 | mtb≥28800 |

Figure 7: Table 2

DATA COMMUNICATION

This application is the U.S. national phase of International Application No. PCT/GB2013/000064 filed 15 Feb. 2013 which designated the U.S. and claims priority to EP 12250045.7 filed 29 Feb. 2012, the entire contents of each of which are hereby incorporated by reference.

FIELD OF THE INVENTION

The present invention relates to data communication. In particular, it relates to the management of an access network including Digital Subscriber Line (DSL) connections.

BACKGROUND TO THE INVENTION

Dynamic Line Management (DLM) is a technique for improving the stability of DSL connections. (NB The term "xDSL" is sometimes used to refer to any of an increasing family of DSL technologies, but the term "DSL" will in general be used here). DLM is particularly useful when operating DSL connections at close to their maximum speed, because under these conditions external noise affecting the transmitted signal can cause the transceivers to be unable to successfully recover the signal to be transmitted with sufficient reliability to enable the connection to be maintained. If this occurs, the connection needs tote re-established. This is referred to as a re-synch or a re-train and the user notices a temporary loss of service while the connection is re-established. Re-synchs are generally found to be particularly annoying by end-users.

DLM seeks to minimise re-synchs by automatically analysing DSL connections (especially the rate of occurrence of re-synchs) and varying certain parameters which can affect the likelihood of re-synchs occurring (for example the depth of interleaving, the amount of redundancy built into the encoding used, etc.). Typically, this is done by using a number of different "profiles" having various different sets of values for the parameters most likely to have an impact on the stability or otherwise of DSL connections and moving a particular connection between different profiles until a profile is found which provides an acceptable stability. The profiles are applied at the local exchange (sometimes referred to—especially in the USA—as the Central Office) usually within a piece of equipment known as a Digital Subscriber Line Access Multiplexer (DSLAM) which houses a number of DSL transceiver units as is well known in the art.

Typically, the profiles are conceptually able to be thought of as ranging between "more aggressive" and "less aggressive", where the more aggressive profiles tend to provide better services to the user in terms of especially higher bit rates and lower latencies, but are more likely to result in the line being unstable, whereas less aggressive profiles tend to offer lower bit rates and/or latencies but greater stabilities.

An Alcatel Technology White Paper from April 2005 entitled "Dynamic Line Management for Digital Subscriber Lines" previously available at the following URL: http://www1.alcatel-lucent.com/com/en/appcontent/apl/18812_DLM_twp_tcm172-228691635.pdf discusses DLM and suggests in overview an implementation in which there is a "Validation" phase and an "Operations" phase. In the Validation phase a connection is monitored fairly intensively to identify an appropriate profile for the line and thereafter it is monitored less intensively to ensure that the originally selected profile continues to remain valid.

International patent application WO2008/093045 describes an earlier DLM solution devised by the present applicants in which very unstable data connections are detected in an efficient manner and corrective action is taken within a relatively short period of time whilst data connections which are not very unstable are monitored and transitioned between different profiles based on more thorough monitoring over a longer time-scale.

DLM solutions such as those above use, as at least one of the metrics used in monitoring the performance of a line, the number of re-trains or re-synchs occurring on a line within a predetermined period of time. In view of the fact that this metric can in certain circumstances be misleading, International patent application WO2009/081131 proposed a technique intended to allow for a more reliable metric of line performance to be provided. The technique disclosed involves processing data on the number of re-trains or re-synchs occurring on a line within a predetermined period of time in order to take account of the possibility that some re-synchs may be caused (i.e. intentionally) by user action rather than as a result of the line experiencing technical problems or instability.

International patent application WO20091081129 describes another DLM technique devised by the present applicants in which a stability level is associated with each data connection, specifying a desired level of stability for that data connection. The customer may then be offered a choice between a plurality of different levels of stability, each of which may be suitable for a different type of activity. The stability level may be chosen by the user of the data line in question, or chosen on their behalf by their service provider in dependence on an indication of the application the user is determined to be using. Alternatively, service providers may simply select a stability level on behalf of their customers.

Referring now to other prior art techniques, U.S. Pat. No. 7,830,955 relates to managing digital communication systems, and to adaptive control of various transmission parameters, such as maximum transmit power spectral density, maximum aggregate transmission power, transmission band preference, minimum and maximum receiver margin, frequency-dependent bit-loading and power controls and/or bit-loading restrictions in communication systems such as DSL systems. In particular, it suggests that configuring the parameters of a DSL system related to power, band usage and margin may be done based on collected operational data, collected for a DSL system operating under a known configuration and/or profile. A target profile is selected based on binder-level information, which can include deployment point information, topology information, and/or crosstalk coupling information.

United States application US2009207985 also relates to digital communication systems, and relates specifically to managing distributed and/or bonded vectored DSL systems. It discusses how a controller such as a DSL management entity, a "Spectrum Management Center" (SMC) or otherwise can be used to collect and analyse operational data and/or performance parameter values, and refers to an example in which the SMC determines the maximum safe data rate at which the line can operate with acceptably low probability of service disruption, loss, or customer complaint. In calculating the best data rates, the SMC can incorporate the service providers' products (i.e. data rates and quality of service requirements at those data rates, which are also a function of the customer service selection and willingness to pay), billing management, and general provisioning practice and coordination with operations, and can supply the profile along with any vectoring information to the DSL line for implementation by the DSLAM or an element management system.

Typically, Dynamic Line Management is implemented by an entity such as a network operator in respect of data connections used by end-users who are in fact (direct) customers of Internet Service Providers (ISPs) or other such communication providers, rather than (direct) customers of the network operator. While techniques such as those referred to above allow a network operator to implement DLM in a manner that reacts in a variety of ways to criteria such as performance data and desired stability levels for each data connection, network operators have so far implemented DLM for the data connections they handle using a single DLM engine. Although such a DLM engine may operate against a set of possible thresholds, which may be configurable on a line-by-line basis, the root DLM engine has therefore generally been the same for each communication provider for which the network operator is implementing DLM.

In particular, it will be noted that none of the prior techniques discussed above suggest taking account of a service-provider-associated category (in addition to the usual performance data) in the profile-updating decision.

SUMMARY OF THE INVENTION

In view of the above, the present inventors have realised that a network operator may be able to provide an improved service to its direct customers (i.e. the communication providers) if it is able to implement DLM in a different fundamental manner for each communication provider. This in turn may allow the communication providers to be able to offer distinct broadband services to their customers (i.e. the end-users).

According to a first aspect of the invention, there is provided a method of determining a data connection profile for a data connection between one of a plurality of end-user devices and an aggregation transceiver device at which data connections in respect of a plurality of end-user devices are aggregated for onward connection through an access network, the data connection being one of a plurality of data connections belonging to one of a plurality of predetermined categories, each category being associated with one of a plurality of service providing entities, each of the plurality of data connections belonging to one of the plurality of predetermined categories, the method comprising, in respect of one of said data connections:

receiving performance data indicative of the performance of the data connection;

receiving an entity identifier indicative of one of said plurality of service providing entities, and determining in dependence thereon the category to which the data connection belongs; and determining a data connection profile for the data connection in dependence on the performance data and on the category so-determined, the data connection profile specifying a set of values for one or more parameters associated with the data connection.

According to preferred embodiments, the step of determining a data connection profile for the data connection may comprise what may be thought of as a two-stage process, involving selecting one of a plurality of profile determination algorithms in dependence on the category so-determined, then using the selected profile determination algorithm to determine the data connection profile in dependence on the performance data.

The step of determining a data connection profile for the data connection may comprise what may be thought of as a one-stage process, involving determining the data connection profile using a profile determination algorithm which determines profiles as a function of performance data and entity identifiers.

According to preferred embodiments, the step of determining a data connection profile for the data connection may comprise selecting the data connection profile from a plurality of different predetermined data connection profiles.

Alternatively, the step of determining a data connection profile for the data connection comprises determining a set of values for the one or more parameters associated with the data connection.

According to preferred embodiments, the method may further comprise associating a stability indication with the data connection, the stability indication indicating a desired level of stability for the data connection, the step of determining a data connection profile for the data connection being performed in dependence also on the stability indication.

According to preferred embodiments, the step of receiving performance data may comprise receiving connection data relating to one or more monitoring periods, said connection data comprising, for each of said one or more monitoring periods, an indication of whether or not the data connection has experienced instability during said one or more monitoring periods.

The connection data in respect of a data connection and relating to said one or more monitoring periods may comprise an indication of whether or not said data connection has re-synchronised during said one or more monitoring periods, and/or of the number of times said data connection has re-synchronised during said one or more monitoring periods.

Alternatively or additionally, the connection data in respect of a data connection and relating to said one or more monitoring periods may comprise an indication of whether or not errors have occurred in data traversing said data connection during said one or more monitoring periods, and/or of the number of errors that have occurred in data traversing said data connection during said one or more monitoring periods.

According to preferred embodiments, the data connections are digital subscriber lines including remote and central transceiver units connected over a copper pair and operating in accordance with one or more of the various xDSL standards agreed by the International Telecommunication Union.

According to preferred embodiments, the aggregation transceiver device is a Digital Subscriber Line Access Multiplexer (DSLAM, mini-DSLAM, or DSLAM/MSAN) comprising a plurality of central transceiver units operating in accordance with an xDSL standard.

According to preferred embodiments, the "categories" in dependence on which data connection profiles are determined for respective data connections may correspond to entities such as Internet Service Providers (ISPs) or other such network service providers. The correspondences between categories and entities may be on a one-to-one basis (e.g. each category may correspond to just one service providing entity), a one-to-many basis (e.g. each category may correspond to more than one service providing entity), a many-to-one basis (e.g. a few different categories may correspond to different sub-categories of one service providing entity) or a many-to-many basis (e.g. a plurality of different categories may correspond to a plurality of different sub-categories spread across a plurality of different service providing entities).

Methods according to the first aspect may form part of a method of operating an access network including a plurality of data connections between end-user devices and an aggregation transceiver device at which the data connections are aggregated for onward connection through the access network, the method of operating an access network comprising, in respect of each of a plurality of said data connections:
  determining a data connection profile for the data connection, according to the first aspect; and
  applying the data connection profile so-determined to the data connection.

Such a method may be performed by an access network operating entity, on behalf its service providing entity customers, for example.

Alternatively, methods according to the first aspect may form part of a method of determining data connection profiles for each of a plurality of data connections between respective end-user devices and an aggregation transceiver device at which said data connections are aggregated for onward connection through an access network, the method of determining data connection profiles comprising, in respect of each of said plurality of data connections:
  determining a data connection profile for the data connection, according to the first aspect; and
  providing data indicative of the data connection profile so-determined to a data network operator whereby to enable the data network operator to apply the data connection profile so-determined to the data connection.

Such a method may be performed by an entity operating a data centre and implementing a method according to the first aspect on behalf of one or more access-network-operating entities as a stand-alone data-centre service, for example.

Preferably two main parameters which control the operation of xDSL connections are the Signal-to-Noise Ratio (SNR) margin (or "target margin") and the fast/interleave mode (or "interleave depth").

The SNR margin represents the amount of redundancy built into the selected bit rate (and other connection options) for the connection, given the measured value of the actual SNR experienced by the modem. Thus, each possible set of significant values for the connection parameters (i.e. bit-rate, level of trellis coding, level of interleave, etc.) has a corresponding baseline SNR which represents the minimum value of the SNR at which the connection would be expected to operate with a Bit Error Rate (BER) of $10^{-7}$ (i.e. 1 bit is expected to be in error for every $10^7$ bits); this BER of $10^{-7}$ is called the target rate as the connection is expected to operate very well with this level of BER. The SNR margin represents the amount (in decibels) by which the actual measured SNR exceeds this baseline amount at the time of setting up the connection. Thus the actual received SNR may vary over time, after setting up the connection, below the measured amount at setting up the connection by up to the amount of the margin and still the connection would be expected to operate with a BER of less than or equal to the target amount (i.e. at least as good as the target amount).

The definition of SNR margin which is given in the xDSL standard ITU G992.1 Section 9.5.1 is: "Signal-to-Noise Ratio (SNR) margin: The signal-to-noise ratio margin represents the amount of increased received noise (in dB) relative to the noise power that the system is designed to tolerate and still meet the target BER of $10^{-7}$, accounting for all coding (e.g. trellis coding, RS FEC) gains included in the design. The SNR margin ranges from −64.0 dB to +63.5 dB with 0.5 dB steps." (NB "RS FEC" refers to Reed-Solomon "Forward Error Correction" schemes.)

It will thus be appreciated that the lower the SNR Margin, the higher the headline bit rate that will be achievable (i.e. assuming that there are no errors). Whilst, the higher the SNR Margin, the more likely that the connection will operate in a stable manner, even in a fluctuating noise environment.

Fast/interleave mode switches the depth of interleave between no interleave (FAST mode) and any of the depths of interleave defined in the currently applicable ADSL standards (e.g. the ITU G.992.x standards). In many implementations, only the lowest level of interleave (a depth of 2, where units in a single code word which are adjacent before interleaving are separated by one interleaved unit from another word after interleaving) is used at the moment; however, this may change in the future. As is well known in the art, use of interleave protects against short duration noise spikes by interleaving units (e.g. bytes) of a certain number (depending on the depth of interleave) of code words (each comprising several units) where each code word has a certain amount of error protection such that a relatively small number of errored units per code word can be recovered by the error protection mechanism to recover the original code word completely (e.g. if there are 5 units (e.g. bytes) per code word and the error correction mechanism can recover code words where one unit is errored, an interleave depth of 2 would enable both interleaved words to be recovered if a noise caused two adjacent units within a two word transmission period to become corrupted). Interleaving provides protection against impulsive noises at the expense of increased latency (and greater buffering requirements of network equipment).

The functionality (or sub-components of this functionality) according to embodiments of the invention may be performed by a number of different devices. In particular, the decision-making regarding the determination of a profile to be applied to a particular data connection may be performed within the aggregation transceiver device (e.g. the DSLAM or mini-DSLAM) or a device associated therewith, or (as set out below) in a separate management device.

Preferably, profiles and/or profile determination algorithms are stored on the network side (e.g. in DSLAMs or mini-DSLAMs, in element managers, or in a separate management device), the network operator having responsibility for determining the profile to be applied to a connection. This may be done partly in response to messages coming from an end-user's modem. Profiles need not be predetermined—they may be determined by determining individual parameters thereof, or by specifying parameters according to the so-called "Vector of Profiles" proposal (discussed in Technical Report TR-165, dated March 2009, from the Broadband Forum).

According to a second aspect of the invention, there is provided a management device for use in an access network including a plurality of data connections between end-user devices and an aggregation transceiver device at which the data connections are aggregated for onward connection through the access network, each data connection belonging to one of a plurality of predetermined categories, each category being associated with one of a plurality of service providing entities, the device comprising:
  a receiver operable to receive, in respect of one or more of said data connections:

performance data indicative of the performance of the data connection; and an entity identifier indicative of one of said plurality of service providing entities; and a processor unit operable to determine, in respect of each of said one or more data connections, the category to which the data connection belongs, in dependence on the entity identifier received in respect thereof, and to determine a data connection profile for the data connection in dependence on the performance data received in respect thereof and on the category so-determined in respect thereof, the data connection profile specifying a set of values for one or more parameters associated with the data connection.

A management device according to the second aspect may be operated as (or within) a component of an access network, such as a Rate-Adaptive Management Box (RAMBo), for example, in which case it may receive line data (i.e. performance data and entity identifiers) directly from one or more element managers, for example, and provide information thereto indicative of the profiles determined and/or the parameters thereof.

Alternatively, a management device according to the second aspect may be operated as (or within) a component of a data centre, for example, in which case it may receive line data (i.e. performance data and entity identifiers) from one or more access network operating entities, for example, and provide information thereto indicative of the profiles determined and/or the parameters thereof.

Further aspects of the present invention relate to systems, devices, computer programs and carrier means or media as set out in the accompanying claims, especially tangible carrier means such as optical storage devices (e.g. compact discs (CD's) or DVD's), or magnetic storage devices such as magnetic discs, or non-volatile solid-state memory devices.

The various options and preferred embodiments referred to above in relation to the first aspect are also applicable in relation to the second and further aspects.

BRIEF DESCRIPTION OF THE FIGURES

In order that the present invention may be better understood, embodiments thereof will now be described, by way of example only, with reference to the accompanying drawings in which:

FIG. 7 shows Table 2 as referred to in the description, which shows thresholds for categorising lines according to the profile determination algorithm to which Table 1(a) relates.

DETAILED DESCRIPTION OF EMBODIMENTS

Figure 1:
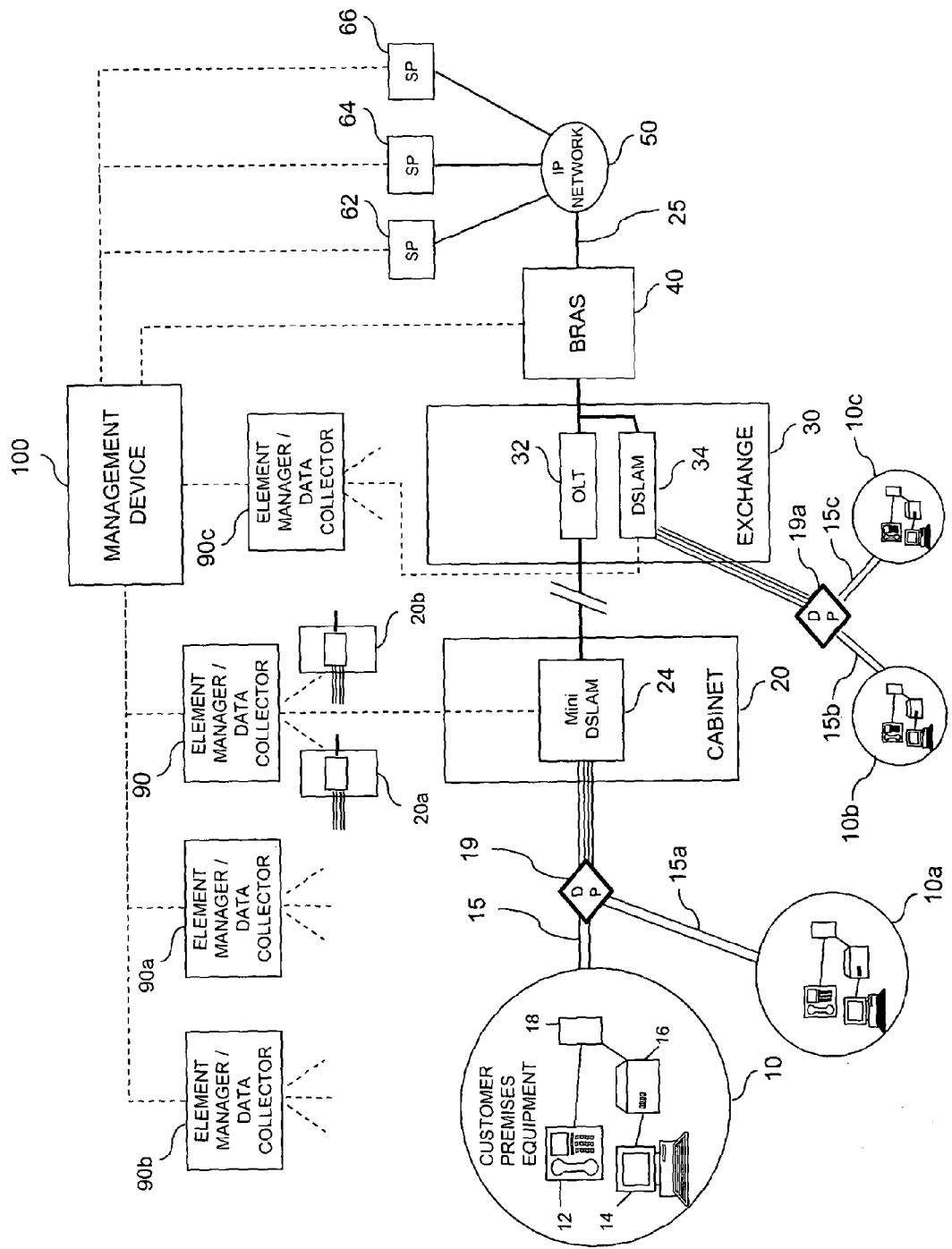
FIG. 1 is a schematic block diagram illustrating a telecommunications network incorporating a management device operating in accordance with a method according to the present invention.

The embodiment described below uses a management device 100 to perform two principal functions—Broadband Remote Access Server (BRAS) provisioning and Dynamic Line Management (DLM). The BRAS provisioning is described in brief in this application, for the sake of completeness, but it is described in greater detail in co-pending International patent applications WO2007/012869 and WO2007/012867, for readers interested in the particulars of the preferred methods of BRAS provisioning applicable to the main embodiment. It should be noted that with some embodiments, it need not be performed by the management device 100 at all.

As for the DLM function, this is desirable because the downstream speed of the ADSL connections controlled by the management device of the main embodiment rate adapts to the highest speed the line can support from 2 Mb to 8 Mb. As the ADSL connections are running at their maximum limits they are more susceptible to noise which can cause errors and spontaneous resynchronisations (re-synchs).

In overview, the role of the DLM function of the management device is to ensure that Digital Subscriber Line (DSL) connections provide a good compromise between the stability of the line and the performance of the line in terms of bit rate (or perhaps more importantly the rate at which a user can receive desired data—after any lost packets caused by errors have been re-sent, for example) and latency. The DLM function does this by receiving data from DSLAM Data Collectors each day and processing this received data. The DLM function is then able to determine an appropriate updated profile for the connection. This may be done by selecting a profile from a set of predetermined profiles, with an increased or decreased noise margin (i.e. the SNR margin) and/or interleave level, for example, or by determining parameters whereby to create a suitable new profile. This basic functionality may be enhanced with logic to filter the data received in order to avoid profile updates being made in response to performance issues that are unlikely to have affected overall user experience, and to minimise churn or oscillation of profiles (by attempting to stabilise the profile for each connection, rather than reacting to every relevant change in the environment of the connection which could cause the maximum stable profile applicable to change).

Briefly, the overall process of determining an updated profile for a particular line according to a preferred embodiment can be divided into two stages, as follows:

(i) Selection of an appropriate profile-determination algorithm; and (ii) Use of the selected profile-determination algorithm to determine an updated profile.

In the preferred embodiment, the selection of an appropriate profile-determination algorithm for a particular line in stage (i) is performed in dependence on an entity identifier, received by the management device with or separately from other data relating to the line. This entity identifier identifies (directly or indirectly, as will be discussed later) the "retail" service provider responsible for the line in question. From this, the management device is able to select a profile-determination algorithm that has been provided by or chosen by that retail service provider, as the algorithm to be used in the determination of profiles to be applied to the lines of its end-user customers.

Having been selected as the appropriate profile-determination algorithm, that algorithm is then used by the management device in stage (ii) to determine the profile to be applied to the line, in dependence on other received data (which will generally be referred to as "performance data") relating to the line in question.

It will be understood that in alternative embodiments, the overall process need not be split into the two stages as set out above, or be split into two stages at all. The management device may instead use, in a single stage, a single global algorithm, the output of which depends on the received entity identifier and on the received performance data in respect of a particular line.

Before discussing the preferred embodiment in detail, the components and entities that may be involved in implementing embodiments of the present invention will be discussed with reference to FIG. 1. It will be noted that this figure shows the components and entities that may be involved in a "Fibre to the Cabinet" (FTTC) scenario, and also shows components and entities that may be involved in a "non-FTTC scenario" in which copper pairs are used for the ADSL signal through the whole access network from a customer premises to a Broadband Remote Access Server (BRAS). Embodiments of the invention are applicable in relation to both of these scenarios, and others, In order to illustrate this, data connections in respect of four customer premises are shown, of which customer premises 10 and 10a serve to illustrate an FTTC scenario, and customer premises 10b and 10c serve to illustrate a non-FTTC scenario.

Within the customer premises 10, there is shown an ADSL splitter filter 18, a telephone 12, an ADSL modem 16 and a computer 14.

In the context of an FTTC scenario, a copper-pair loop 15 (which forms part of the access network which extends between equipment at customer premises 10 and a local cabinet 20) connects the equipment to a DSLAM 24 housed in the cabinet 20. Other copper pair loops 15a from equipment at other customer premises 10a may be aggregated at a drop-point (DP) 19 before proceeding together to the cabinet 20.

On the network side of the cabinet, the aggregated signals are carried, using optic fibre 25, to Optical Line Termination (OLT) equipment 32 in the exchange 30, at which optic fibre from cabinet 20 and many other similar cabinets are aggregated before proceeding together via a Broadband Remote Access Server (BRAS) 40 and via IP network 50 to multiple Service Providers (SP's) 62, 64, 66, At the BRAS 40, IP traffic flows from (and to) the multiple Service Providers are aggregated (and disaggregated).

FIG. 1 also illustrates the route via which data traffic may pass through the access network in a non-FTTC scenario, in which copper pairs 15b and 15c run all the way to the exchange 30 from customer premises 10b and 10c respectively. Copper pairs 15b and 15c are aggregated at a drop-point 19a which is connected directly to a DSLAM 34 at the exchange 30, before proceeding (together with "FTTC" traffic) to the BRAS 40. The DSLAM separates normal voice traffic and data traffic and sends the voice traffic to the Public Switched Telephone Network (PSTN) (not shown). As an alternative to a DSLAM, an MSAN (Multi-Service Access Node) may be used, which allows for customers' lines to be connected to the core network, to provide telephone, ISDN, and broadband such as DSL all from a single platform.

In relation to FTTC scenarios, DSLAMs located in cabinets are generally referred to as "mini-DSLAMs", but unless it is appropriate to distinguish between them, reference will generally be made simply to DSLAMs even when these would in fact be mini-DSLAMs.

In some cases the first hop of an IP packet travelling from computer 14 towards an ISP 62, 64, 66 would be the BRAS 40; whereas in other cases the first hop from an IP perspective could be beyond the BRAS 40.

Generally, the end-user's modem 16 creates a Point-to-Point Protocol (PPP) session from the modem to another device in the network. This is a logical end-to-end connection that carries the end-user's traffic from the modem to the target IP network.

In some cases, the PPP session is terminated on the BRAS, and then onward routed directly onto the Internet.

In one example configuration where the PPP session is not terminated at the BRAS 40, the PPP session is terminated on a "home gateway" at the edge of the core network, connected to the Service Provider (SP). In another example configuration a Layer 2 Tunnelling Protocol (L2TP) tunnel is used to pass through the BRAS 40 to a terminating BRAS which belongs to the SP; the L2TP tunnel tunnels all the PPP sessions into the SP network for them to handle as they want.

Generally, the first IP hop is from the end-user to the terminating BRAS (i.e. over the PPP connection). Furthermore, the BRAS 40 is responsible for policing the amount of traffic flowing downstream (i.e. from the network towards the customer premises equipment) towards each line connected to the BRAS 40, to ensure that it does not exceed a maximum amount provisioned for that line. This policing is either done at the IP layer (Where the BRAS 40 terminates a PPP connection from the customer premises equipment) or at a lower level (e.g. at the ATM layer) where there is some sort of sub-IP layer tunnelling through the BRAS 40.

The above mentioned arrangement of items 10, 15, 19, 20, 30, 40, 50, 62, 64 and 66 is conventional. However, in addition to this conventional arrangement, in the present embodiment there is a management device 100 which communicates with both the DSLAM 24 or 34 and the BRAS 40. The detailed operation of this device (especially as regards its DLM function) is explained in greater detail below with reference to FIG. 2. However, in overview it obtains information from the DSLAMs 24, 34 about the rate at which each line connects to the applicable DSLAM and information about events such as detected errors and/or re-synchs occurring on the line/connection and modifies the operation of the DSLAMs as regards the aggressiveness of the profile used by a respective DSLAM for a respective DSL connection.

It will be noted that mini-DSLAM 24 in cabinet 20 is in communication with the management device 100 via an Element Manager/Data Collector 90, the management communication being symbolised by a dotted line. This serves as an aggregation point in respect of performance data in respect of data connections 15, 15a, which are connected via mini-DSLAM 24 in cabinet 20, and also in respect of data connections connected via other mini-DSLAMs in other cabinet 20a, 20b. Also shown are other Element Manager/Data Collectors 90a, 90b, each of which serve as aggregation points in respect of performance data in respect of mini-DSLAMs in other cabinets, and Element Manager/Data Collector 90c which serves as an aggregation point in respect of performance data in respect of DSLAM 34 in exchange 30. Each DSLAM or mini-DSLAM may handle several end-user data connections via multiple drop-points.

As will be discussed in more detail later, Element Manager/Data Collectors 90, 90a, 90b, 90c also serve as disaggregation points in respect of a different function, namely the distribution of DLM profiles from the management device 100 to the applicable DSLAM, so that they can be applied to the data connections for which they have been determined to be appropriate.

While the Element Manager/Data Collectors 90, 90a, 90b, 90c each perform the dual functions of gathering data and passing it upstream to the management device 100 and passing DLM profiles downstream to the DSLAMs, they will generally be referred to simply as "Element Managers 90" in the text below.

Figure 2:
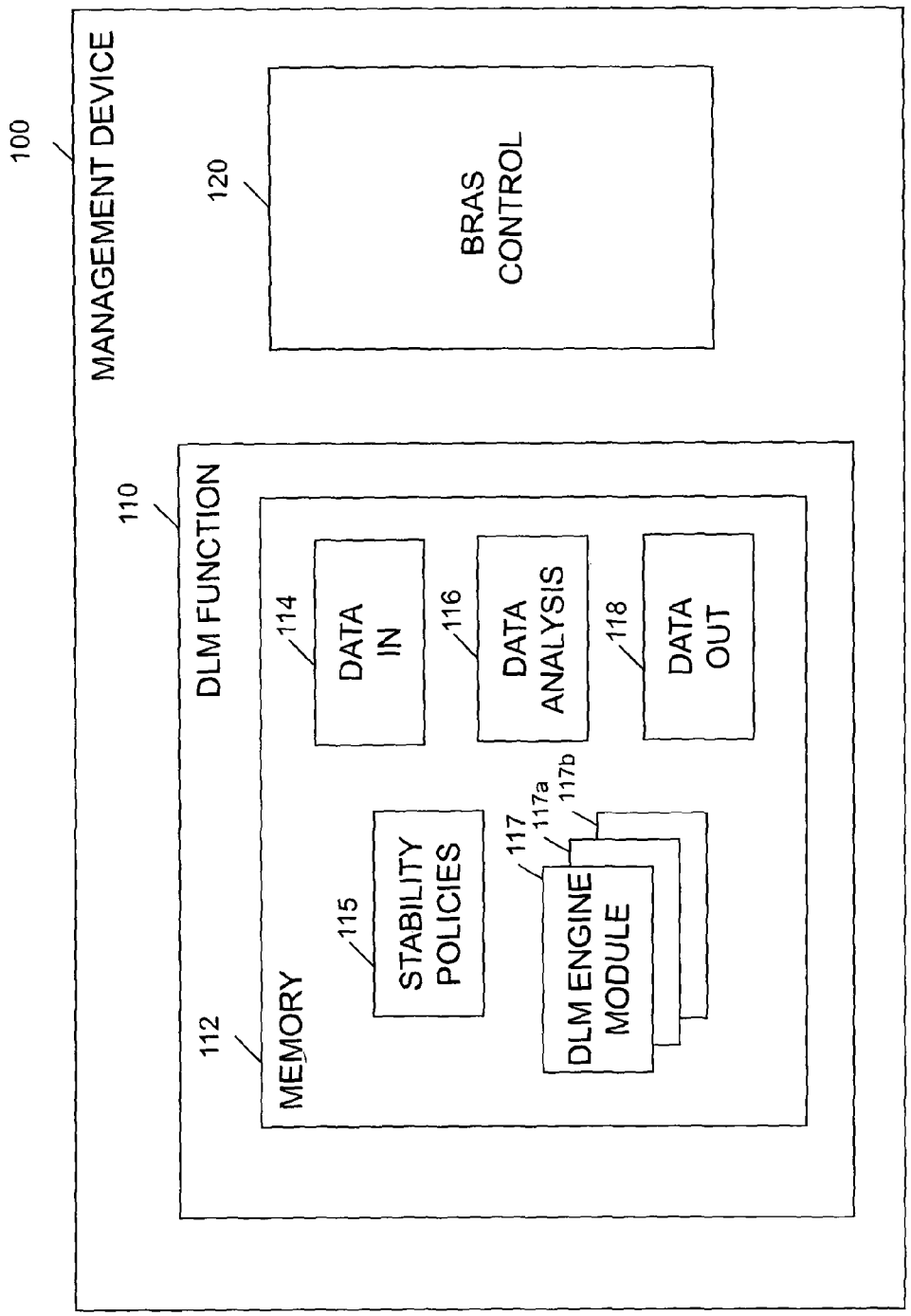
FIG. 2 is a schematic block diagram illustrating the management devices of FIG. 1 in more detail.

As shown in FIG. 2, the management device 100 comprises two main functional parts, a BRAS provisioning or BRAS control function 120 and a Dynamic Line Management (DLM) function 110. The BRAS control function 120 will be described briefly here, for the sake of completeness, but as will be explained, it need not be performed by the management device 100 at all—it may instead be performed under the control of a DSLAM.

The BRAS provisioning function 120 processes part of the information received from the DSLAMs to assess a consistent connection speed achieved by each DSL. If it determines that this consistent rate has increased as a result of recent higher rate connections, it instructs the BRAS to allow higher through flows of traffic for that DSL. On the other hand, if it detects that a particular connection speed is below the stored consistent value, it reduces the consistent value to the current connection rate and immediately informs the BRAS of the new consistent value rate so that the BRAS does not allow more traffic to flow to the DSL than the DSL is currently able to cope with.

Precise details of some of the algorithms which may be used by the BRAS Control function 120 of the management device 100 to calculate a consistent rate in the present embodiment are described in International applications WO2007/012869 and WO2007/012867 (referred to above). It should be noted however that the intention of these algorithms may be to arrange for the user to receive data at the highest rate which his/her DSL is consistently able to obtain without requiring the BRAS to be reconfigured every time the DSL is connected at a new maximum rate. At the same time the algorithms seek to ensure that if a DSL connects at a rate which is below that at which the BRAS is currently configured to allow data through for that DSL, then the BRAS is quickly reconfigured to avoid overloading the DSLAM.

It should be noted that in some scenarios, the BRAS control functionality described here as being performed under the control of a BRAS Control function 120 in the management device 100 may instead be performed under the control of a similar function in the DSLAM (or mini-DSLAM, or DSLAM/MSAN), which may communicate directly with the BRAS in relation to this, in which case the management device 100 need not communicate with the BRAS 40.

Turning now to the DLM function 110, this is shown as having a memory 112 in which are stored various software code modules, including a DLM data receiving code module 114 (DATA IN) which causes implementation of a DLM data receiving sub-function, a DLM analysis code module 116 (DATA ANALYSIS) which causes implementation of a DLM analysis sub-function, a DLM output code module 118 (DATA OUT) which causes implementation of a DLM output sub-function, and a stability policy data set 115 (STABILITY POLICIES) in which stability levels or policies associated with individual DSL connections may be held. The memory 112 may also store a forced resynchronisation estimation module (not shown) for implementing a sub-function to estimate the number of resynchronisations for each line in each batch of data caused as a result of some sort of error, etc. occurring in the connection rather than as a result of user actions (e.g. to switch off or disconnect their DSL modem).

Furthermore, the memory contains a plurality of DLM engine modules 117, 117a, 117b. Each module contains data allowing profiles to be determined for data connections associated with a particular one of the service providers 62, 64, 66 (shown in FIG. 1). As indicated by the dotted lines between of the service providers 62, 64, 66 and the management device 100, each service provider may provide information to management device 100, generally prior to the ongoing DLM process as performed by the management device 100, setting out the manner in which the service provider wishes DLM profile determination to be performed in respect of its own customers. This may involve choosing one or more algorithms from a set of predetermined profile determination algorithms, providing one or more particular profile determination algorithms itself, or indicating that it wishes for profiles to be created as required by determination of suitable parameters, according to a suitable parameter determination algorithm.

Each of the DLM sub-functions mentioned above may be implemented by standard computer processor components operating in accordance with software code modules stored in the memory 112 forming part of the DLM function 110.

If it is determined that changes to the DSLAM profile of a line are required, a request may be sent to the Operational Support System (OSS) of the access network for the profile applied to the line to be changed. The precise way in which this is performed will depend on the details of the OSS of the particular access network, so will not be described further herein.

As discussed earlier, in the present embodiment, the first stage of the overall profile determination process involves selection of an applicable DLM engine module. This module is then used in the second stage in order to determine the profile to be applied to the line in question, Details of possible profile determination algorithms that may be employed in the present embodiment by the DLM function are set out below, and one type in particular will be described in detail with reference to FIG. 4. Three different algorithms of this type will be discussed with reference to FIGS. 5 and 6. In overview however, a DLM data-receiving sub-function generally receives a new file daily from each element manager 90, the file containing, for each of the connections handled by that element manager, information identifying the connection and/or its associated service provider, and performance data indicative of the performance of the data connection. The data file may also include information about a stability policy or level in respect of each connection, which may influence the selection of the profile determination algorithm and/or the eventual determination of an updated profile.

Figure 3:
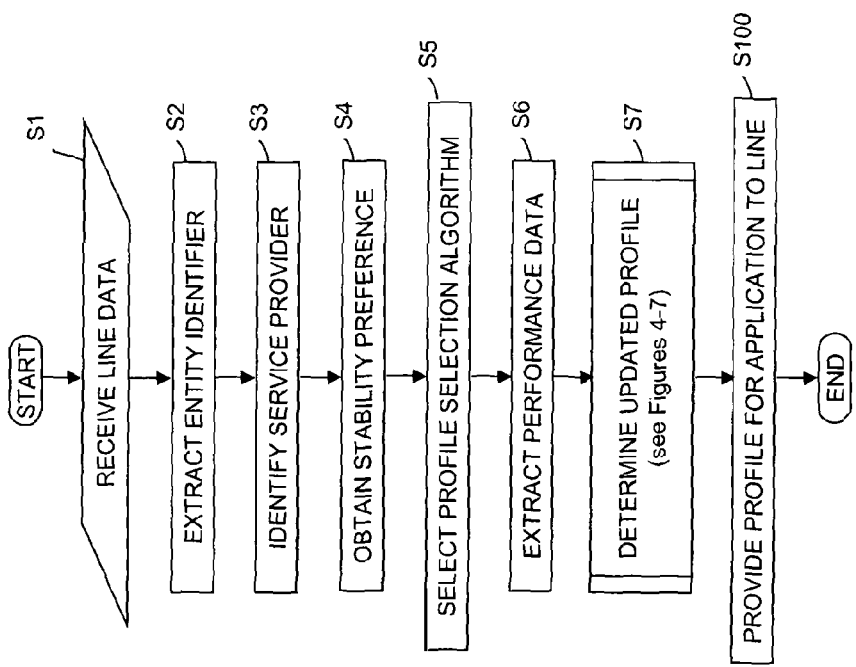
FIG. 3 is a flow diagram illustrating the steps carried out by the management device of FIG. 1 in order to control the DLM profile applied to the DSL connections in the network of FIG. 1.

Referring now to FIG. 3, this shows an overview of the steps that may be performed by the management device 100 in respect of each of a plurality of data connections, in accordance with the preferred embodiment.

At step S1, management device 100 receives line data from each of its element managers 90, which has been received respectively from a DSLAM 24, 34, which itself has determined or received performance data in respect of the data connections it handles.

At step S2, the management device 100 extracts, from the line data about a particular data connection, an entity identifier. This may identify the data connection itself, allowing the management device to identify (from a stored look-up table, for example) at step S3 the service provider responsible for the line. Alternatively, the entity identifier may directly identify that service provider without the need for an additional identification or "look-up" stage.

At step S4, the management device 100 may obtain an indication of a stability preference. This may be manually provided by the user, for example, or determined in dependence on the type of application or applications that the user has been found to use.

At step S5, the management device 100 selects, from the plurality of DLM engine modules 117, 117a, 117b stored in memory 112, the DLM engine module (117, for example) that is applicable for the service provider that has been identified.

At step S6, the management device 100 extracts the performance data from the line data about the data connection. (It will be understood that this step may of course be performed at the same time as the extraction of the entity identifier, or at another stage in the process so far—the order of the steps has been chosen purely in order to simplify the flow-chart of FIG. 3.)

At step S7, the selected DLM engine module 117 is used in conjunction with the received performance data for the line in question in order to determine what the profile for the data connection should now be, This step will be discussed in more detail later with reference to FIGS. 4, 5 and 6.

Once an appropriate profile for the line has been determined, information about it is provided (step S100) via the appropriate element manager 90 to the appropriate DSLAM, which may then apply it to the line in question.

In the present embodiment, the entity identifier extracted at step S2 is used to identify (directly or indirectly), at step S3, the service provider responsible for the line in question. The entity identifier, while indicative of the service provider, may in fact indicate a more specific category than that. It may, for example, indicate that the user of the line has agreed with the service provider for a particular level of service from the service provider, suitable for users who expect to use their data connection a significant amount of time for the purpose of playing games, for example, but who also intend for downloading large files occasionally. Other levels of service from the same service provider may be deemed suitable for other types of users.

Irrespective of whether the category determined in dependence on the entity identifier is simply the service provider responsible for the line or a more specific service level provided by that service provider, it should be noted at this stage that the resulting affect on the determination of a profile is not the same as the affect of taking account of a user-specified or application-dependent stability level policy or stability preference. The determination of a suitable profile in respect of a particular line may depend additionally on such criteria, but it should be noted that these are different criteria that can be directly influenced by the user, whereas the dependence on the category, which is associated directly with the service providing entity concerned rather than the user.

We now turn to the other principal factor upon which the determination of the profile (in step s7) depends, namely the performance data. This is used as an input to a profile determination algorithm (using DLM engine module 117, for example) that has been found (in step s5) to be the applicable algorithm for determining an updated profile for the line in question.

As will be apparent, the manner in which step s7 is performed will vary from one category of line to another, in dependence on the entity identifier. A wide variety of different types of profile determination algorithm exist, and for each type, different thresholds or other values may be used. The precise algorithm may also depend on other issues such as stability preferences, in embodiments in which these are being used as well.

An example of one type of algorithm will be discussed with reference to FIG. 4, and an example of how any of three different versions of this type of algorithm may be selected will be discussed with reference to FIGS. 5 and 6. Generally, however, these algorithms receive, as an input, performance data for the line in question, indicating how well the line has been performing in a recent monitoring period, and allowing a determination to be made as to whether it would be appropriate to change the profile being applied to the line, or parameters thereof, in order to improve that performance. They provide as an output a profile comprising profile parameters. Generally, a profile has two parameters which may be adjusted in order to improve the stability of the line or conversely to improve the bit-rate or low-latency of the connection: the target margin and the run mode (the latter enabling the use of interleaving). Changing these parameters is based on two performance metrics in the present embodiment, errors (in particular, in this embodiment, errors caused by code-violations) and re-trains (i.e. re-synchs).

Figure 4:
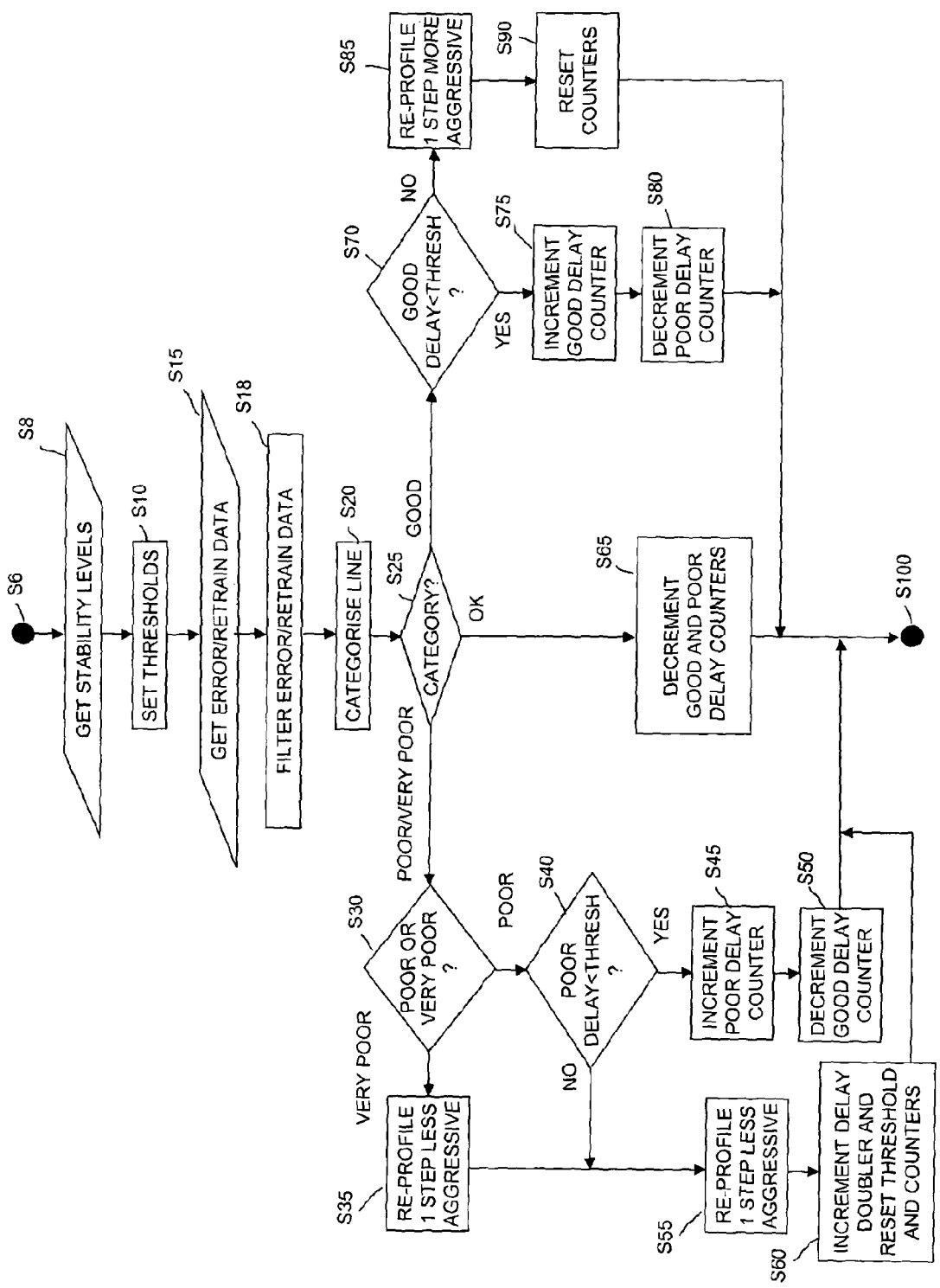
FIG. 4 shows one possible sub-routine to be performed as a step within FIG. 3, in order to enable a selected type of profile determination algorithm to be used to determine a DLM profile to be applied to a DSL connection.
Figure 5:
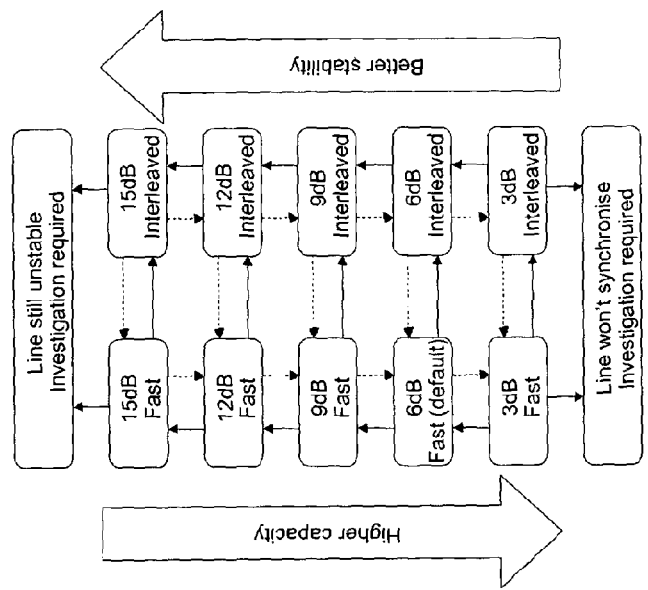
FIG. 5 shows Table 1(a) as referred to in the description, which shows the basic flow of the DLM process according to the possible profile determination algorithm to which FIG. 4 relates.
Figure 6:
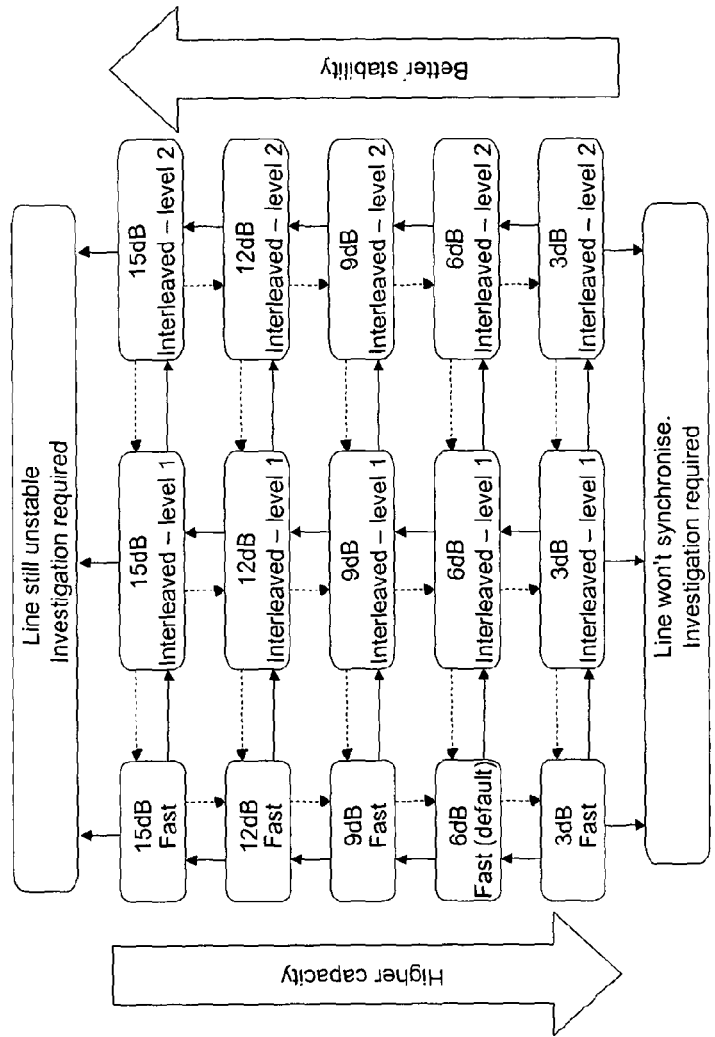
FIG. 6 shows Tables 1(b) and 1(c) as referred to in the description, which show the flow of the DLM process according to two other possible profile determination algorithms.
Figure 6:
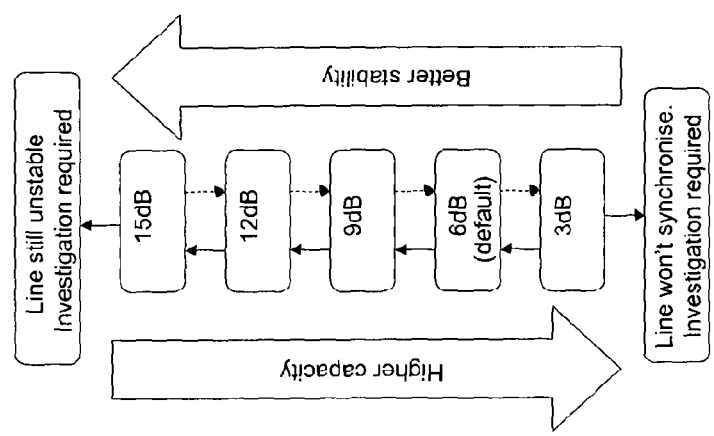

Before discussing the type of algorithm illustrated by FIG. 4 (and three possible variants thereof, as illustrated by FIGS. 5 and 6), some issues concerning performance data common to different algorithms will be discussed.

The main source of performance data for the DLM function is generally a file from the respective element manager 90, a, b, c, giving an aggregated report of each line's activity over a preceding monitoring period.

The performance data in a file generally relates to a fixed-length monitoring period (e.g. a twenty-four hour monitoring period), but this may be irregular in some algorithms, The monitoring periods may be split into a number of timeslots (i.e. a twenty-four hour monitoring period (or whatever longer period is chosen) may be partitioned into a number of shorter periods. For the purposes of the following explanation, the longer periods will be taken to be one day, partitioned into ninety-six 15-minute periods (or "bins", as these shorter periods are sometimes known). This generally results in a change in DSLAM profile being applied to each line no more frequently than once every 24 hours, which is advantageous because it avoids the possibility of the DSLAM being reconfigured every time a line re-synchs.

Before any decision regarding the possible determination of a new profile for a particular connection is taken, information from the received file may be filtered in order to extract and use information that enables such a decision to be taken in a way that may be better aligned with what an end-user of the connection may benefit from or appreciate. Further information about ways in which this may be done is provided in International application PCT/GB20111001437 (from the current applicant).

Briefly, however, the performance data obtained in respect of each "bin" generally includes indications of any instability within the 15-minute period in question, and may also include indications of any user activity within the 15-minute period in question. If so, the bins can then be thought of as "active" if it is determined that there has been user activity within the 15-minute period in question, or "inactive (or "dormant")" otherwise. The decision as to whether it is appropriate to select a new profile for the data connection in question can then be taken on the basis of indications of any instability obtained in respect of the "active" bins, thereby allowing whatever instability may have occurred during "inactive" bins to be ignored, as the end-user is unlikely to have been affected by this.

As indicated earlier, as we as performance data, the DLM function may additionally receive input data specifying a stability level for each line. This may be input from a database into which the data has been entered by an operator as part of the process of provisioning a new DSL connection, and stored within the stability policies data set 115 within the DLM memory 112. This means that when a customer orders a DSL connection he/she can be offered different levels of stability (which will be most suitable for certain different types of activity); thus customers who mostly intend to use the connection for video streaming will benefit from a stable connection, whereas customers mostly using their connection for downloading large files, etc. would benefit from a higher bit-rate rather than from very high stability levels.

Alternatively, the stability level could be updated more dynamically. This may be done in dependence on information indicative of the type or types Of application that the user has been using recently, or has mainly been using, or as a result of a request by the user. For the latter, a web server could be provided to receive user requests for a change of stability level (perhaps with a maximum permitted frequency of requests permitted per user, e.g. no more than one per hour or one per day, etc.) and this could then cause the DLM function as soon as possible to re-run it's comparison process for that line with the newly requested stability level and, if as a result of the comparison it is determined appropriate to transition to a new profile, then to transition to the new profile, again as soon as possible so that the user experiences a fairly dynamic response to a request to change the stability level.

Each time a line is checked to see if its profile should be changed (i.e. once every 24 hours as part of a batch processing function, in the present example), the corresponding stability level associated with that line may be read and then threshold values for the profile determination algorithm selected for use in respect of that line may be set depending on the stability level associated with the respective line.

A possible type of profile determination algorithm, that may be selected will now be described with reference to FIG. 4. Briefly, according to this flow-chart, each line is categorised into one of four different categories in dependence upon performance data indicative of the number of errors and/or re-synchs as reported to the DLM function in the bulk file. The categories correspond to "very poor", "poor", "acceptable" and "very stable" (these categories may alternatively be referred to as "very poor", "poor", "OK" and "good", or in other ways).

The basic flow of the DLM process which may result from one version of the type of profile determination algorithm illustrated in FIG. 4 is shown in Table 1(a) included as FIG. 5, which relates to an algorithm that allows for five different target margin levels, each of which may either be in a "FAST" mode or an "INTERLEAVED" mode. Two alternatives (which would result in different algorithms) are shown in Tables 1(b) and 1(c), included as FIG. 6. The algorithm of Table 1(b) allows the same number of target margin levels, but does not allow for an "INTERLEAVED" mode. The algorithm of Table 1(c) allows the same number of target margin levels, and for each of these, allow for two different levels of interleaving.

In the version indicated in Table 1(a), the general progression through the profiles is as follows: if a line is to be changed to a more stable profile, the first change is to move to the profile with the same target margin but in interleaved mode instead of fast mode, if the line is already in an interleaved mode, then the line is moved to the next higher target margin profile also in interleaved mode. If the line is to be moved in the direction of increased capacity, it is kept in the same mode (i.e. fast or interleaved) but moved to the next lower target profile, unless it is at the minimum target margin in interleaved mode, in which case it is moved to the minimum target margin profile in fast mode.

If an algorithm of the type illustrated in FIG. 4 and the version of Table 1(a) has been selected, step s7 of FIG. 3 may be performed in the following way. In brief, for a particular line for which this algorithm has been selected (in step s5 of FIG. 3), an associated stability level may be determined and then a categorisation may be based on threshold values associated with the respective stability level, each stability level having a different set of associated threshold values for use in the categorisation function. Thus, at step S8 the stability level for the particular line to be categorised is obtained.

The process then moves to step S10 in which the threshold values associated with the stability level looked up in step S8 are obtained for use in the remainder of the process and then the process proceeds to step S15.

At step S15 the DLM function obtains the current error and re-synch data which it has received as performance data in respect of the present line being analysed.

At step S18, a filtering step may be performed as discussed earlier, by correlating data indicative of instability with data indicative of user activity.

The process then proceeds to step S20. Step S20 is the step responsible for actually categorising lines into one of four possible different categories (i.e. "very poor", "poor", "OK" and "good", or whichever names are applicable). To do this both of the metrics used, namely no. of errors detected (at both the user modem and the network modem in the DSLAM) and the number of re-synchs (as recorded by the DSLAM) are compared (after normalisation as mentioned above) with various corresponding thresholds whose values are set according to the stability level to which the line is assigned.

Table 2 (included as FIG. 7) sets out possible thresholds that may be used in relation to this profile determination algorithm. These thresholds may be set at different levels in different profile determination algorithms. In Table 2 "mtb" stands for "mean time between" and thus corresponds to the normalised metrics calculated by dividing the total time in seconds for which the respective line has been in synchronisation and in active use over the past 24-hour period of the monitoring by the number of re-trains or errors recorded in that period. According to this algorithm, if there are more than 10 re-trains in any one hour period, the line is assumed to be very poor, regardless of the number of errors recorded. For lines operating at an aggressive stability level, if the average time between retrains is less than once per hour (=3600 seconds) (e.g. 6 re-trains in less than 5 hours of "active up-time") or if the average time between errors is less than one per 10 seconds of active up-time, then the line is deemed to be poor; if the average time between re-trains is less than once every 2.4 hours (but more than once every hour) of active up-time or the average time between errors is less than once every 2.4 hours (but more than once every 10 seconds) of active up-time then the line is deemed to be "OK", whereas if the average time between re-trains is greater than or equal to once every 2.4 hours or if the average time between errors is greater than or equal to once every 2.4 hours, then the line is deemed to be good. From Table 2, it is clear what the thresholds are for the other stability levels in the same way.

Having categorised the line according to Table 2 in step S20 the process proceeds to step S25 where it is determined if the line has been categorised as being "poor", "very poor", "OK" or "good". If the line is categorised as being "poor" or "very poor", the process proceeds to step S30 in which it is determined if the line has been categorised as very poor or poor. If at step S30 it is determined that the line has been categorised as very poor then the process proceeds to step S35 in which an OSS request is issued for the line DLM profile to be transitioned 2 steps in the less aggressive direction, provided it is at least two steps above the minimally aggressive level (which, in Table 1(a) is 15 dB, Interleaved), otherwise it just transitions straight to this minimally aggressive level; if the line is already at this minimally aggressive level, it remains there but a fault is flagged to the system for attention by an engineer. Upon completion of step S35, the method proceeds to step S60.

If at step S30 it is determined that the line has been categorised as poor, the process proceeds to step S40 in which it is determined if the poor delay counter is less than the poor threshold. If so, the method proceeds to step S45 in which the poor delay counter is incremented (by one) then the method proceeds to step S50 in which the good delay counter is decremented (by one). Upon completion of step S50, the process ends (for the respective line). If at step S40 it is determined, on the other hand, that the delay counter equals (or exceeds) the poor threshold, then the method proceeds to step S55 in which an OSS request is issued for the line DLM profile to be transitioned 1 step in the less aggressive direction, provided it is not already at the minimally aggressive level (which is 15 dB, Interleaved, in Table 1(a)), otherwise it remains there (i.e. at the minimally aggressive level) but a fault is flagged to the system for attention by an engineer. On completing step S55, the method proceeds to step S60.

At step S60, which is arrived at either after performing a two step less aggressive reprofiling in step S35 or after performing a one step reprofiling, in step S55, the delay doubler is incremented by one (provided it has not already reached its maximum value of 5 in which case it just stays at 5) and then the good threshold is reset according to the formula GOOD THRESHOLD=DEFAULT GOOD THRESHOLD*2EXP(DELAY DOUBLER). Finally in step S60, the poor and good delay counters are both reset to zero. Upon completion of step S60, the sub-routine ends (for the respective line being processed) and the DLM function moves on to analysing any further lines requiring analysis in the current 24-hour period batch process.

If at step S25 it is determined that the line is categorised as OK, then the process proceeds to step S65 in which the good and bad delay counters are both decremented by one (although if a counter is already at zero it is not decremented further but rather stays at zero). This decrementing of the delay counters for lines which are categorised as OK ensures that lines which are only occasionally good or only occasionally bad but mostly are OK, will remain on their current profile setting. Upon completion of step S65, the process (for the respective line being processed) ends.

If at step S25 it is determined that the line is "good", the method proceeds to step S70 in which it is determined if the good delay counter is less than the good threshold. If so, the process proceeds to step S75 in which the good delay counter for the line in question, (GOOD DELAY), is incremented (by one). Upon completion of step S75, the process proceeds to step S80 in which the poor delay counter (POOR DELAY) is decremented; this helps to prevent lines which are typically good as often as they are poor from being moved to a different profile. Upon completion of step S80, the process (for the respective line being processed) ends.

If at step S70 it is determined that the good delay counter (GOOD DELAY) is not less than the good threshold (GOOD THRESHOLD)—i.e. it has reached or exceeded the threshold—then the process proceeds to step S85 in which an OSS request is made to transition the DLM profile of the line one step in the more aggressive direction (provided it is not already at the most aggressive profile, which is 3 dB non-interleaved mode in Table 1(a), in which case it simply stays at this most aggressive profile). Upon completion of step S85, the method proceeds to step S90 in which the delay counters, GOOD DELAY and POOR DELAY, for the line is reset and then the process (for the respective line) ends. As mentioned above, once the sub-routine ends for the current line being processed, the DLM function moves on to analysing any further lines requiring analysis in the current 24-hour period batch process.

The invention claimed is:

1. A method of determining a data connection profile for a data connection between one of a plurality of end-user devices and an aggregation transceiver device at which data connections in respect of a plurality of end-user devices are aggregated for onward connection through an access network, the data connection being one of a plurality of data connections belonging to one of a plurality of predetermined categories, each category being associated with one of a plurality of service providing entities, each of the plurality of data connections belonging to one of the plurality of predetermined categories, the method comprising, in respect of one of said data connections:
   receiving performance data indicative of the performance of the data connection;
   receiving an entity identifier indicative of one of said plurality of service providing entities, and determining in dependence thereon the category to which the data connection belongs; and
   determining a data connection profile for the data connection in dependence on the performance data and on the category so-determined, the data connection profile specifying a set of values for one or more parameters associated with the data connection.

2. A method according to claim 1 wherein the step of determining a data connection profile for the data connection comprises selecting one of a plurality of profile determination algorithms in dependence on the category so-determined, and using the selected profile determination algorithm to determine the data connection profile in dependence on the performance data.

3. A method according to claim 1 wherein the step of determining a data connection profile for the data connection comprises determining the data connection profile using a profile determination algorithm which determines profiles as a function of performance data and entity identifiers.

4. A method according to claim 1 wherein the step of determining a data connection profile for the data connection comprises selecting the data connection profile from a plurality of different predetermined data connection profiles.

5. A method according to claim 1 wherein the step of determining a data connection profile for the data connection comprises determining a set of values for the one or more parameters associated with the data connection.

6. A method according to claim 1, the method further comprising associating a stability indication with the data connection, the stability indication indicating a desired level of stability for the data connection, the step of determining a data connection profile for the data connection being performed in dependence also on the stability indication.

7. A method according to claim 1 wherein the step of receiving performance data comprises receiving connection data relating to one or more monitoring periods, said connection data comprising, for each of said one or more monitoring periods, an indication of whether or not the data connection has experienced instability during said one or more monitoring periods.

8. A method according to claim 1 wherein the performance data includes connection data in respect of a data connection and relating to said-one or more monitoring periods, the connection data comprising an indication of whether or not said data connection has re-synchronised during said one or more monitoring periods, and/or of the number of times said data connection has re-synchronised during said one or more monitoring periods.

9. A method according to claim 1 wherein the performance data includes connection data in respect of a data connection and relating to said one or more monitoring periods, the connection data comprising an indication of whether or not errors have occurred in data traversing said data connection during said one or more monitoring periods, and/or of the number of errors that have occurred in data traversing said data connection during said one or more monitoring periods.

10. A method according to claim 1 wherein the data connections are digital subscriber lines including remote and central transceiver units connected over a copper pair and operating in accordance with one or more of the various xDSL standards agreed by the International Telecommunication Union.

11. A method of operating an access network including a plurality of data connections between end-user devices and an aggregation transceiver device at which the data connections are aggregated for onward connection through the access network, the method comprising, in respect of each of a plurality of said data connections:
determining a data connection profile for the data connection, according to the method of claim 1; and
applying the data connection profile so-determined to the data connection.

12. A method of determining data connection profiles for each of a plurality of data connections between respective end-user devices and an aggregation transceiver device at which said data connections are aggregated for onward connection through an access network, the method comprising, in respect of each of said plurality of data connections:
determining a data connection profile for the data connection, according to the method of claim 1; and
providing data indicative of the data connection profile so-determined to a data network operator whereby to enable the data network operator to apply the data connection profile so-determined to the data connection.

13. A management device for use in an access network including a plurality of data connections between end-user devices and an aggregation transceiver device at which the data connections are aggregated for onward connection through the access network, each data connection belonging to one of a plurality of predetermined categories, each category being associated with one of a plurality of service providing entities, the device comprising:
a receiver to receive, in respect of one or more of said data connections:
performance data indicative of the performance of the data connection; and
an entity identifier indicative of one of said plurality of service providing entities; and
a processor unit operable to determine, in respect of each of said one or more data connections, the category to which the data connection belongs, in dependence on the entity identifier received in respect thereof, and to determine a data connection profile for the data connection in dependence on the performance data received in respect thereof and on the category so-determined in respect thereof, the data connection profile specifying a set of values for one or more parameters associated with the data connection.

14. An access network including a management device according to claim 13.

15. Tangible non-transitory storage medium carrying a computer program or suite of computer programs for causing the method of claim 1 to be carried out during execution of the program or programs.

16. The management device according to claim 13 wherein the processor unit is further to:
determine the data connection profile for the data connection by selecting one of a plurality of profile determination algorithms in dependence on the category determined in dependence on the received entity identifier, and using the selected profile determination algorithm to determine the data connection profile in dependence on the performance data.

17. The management device according to claim 13 wherein the processor unit is further to:
determine the data connection profile using a profile determination algorithm which determines profiles as a function of performance data and entity identifiers.

18. The management device according to claim 13 wherein the processor unit is further to:
determine the data connection profile for the data connection by selecting the data connection profile from a plurality of different predetermined data connection profiles.

19. The management device according to claim 13 wherein the processor unit is further to:
determine the data connection profile for the data connection by determining a set of values for the one or more parameters associated with the data connection.

20. The management device according to claim 13 wherein the processor unit is further to:
associate a stability indication with the data connection, the stability indication indicating a desired level of stability for the data connection, and perform determination of the data connection profile for the data connection in dependence also on the stability indication.

21. The management device according to claim 13 wherein the received performance data comprises connection data relating to one or more monitoring periods, said connection data comprising, for each of said one or more monitoring periods, an indication of whether or not the data connection has experienced instability during said one or more monitoring periods.

22. The management device according to claim 13 wherein the received performance data comprises connection data in respect of a data connection and relating to one or more monitoring periods, the connection data comprising an indication of whether or not said data connection has re-synchronised during said one or more monitoring periods, and/or of the number of times said data connection has re-synchronised during said one or more monitoring periods.

23. The management device according to claim 13 wherein the received performance data comprises the connection data in respect of a data connection and relating to one or more monitoring periods, the connection data comprising an indication of whether or not errors have occurred in data traversing said data connection during said one or more monitoring periods, and/or of the number of errors that have occurred in data traversing said data connection during said one or more monitoring periods.

24. The management device according to claim 13 wherein the data connections are digital subscriber lines including remote and central transceiver units connected over a copper pair and operating in accordance with one or more of the various xDSL standards agreed by the International Telecommunication Union.

* * * * *